United States Patent [19]
Nagashima

[11] Patent Number: 5,982,871
[45] Date of Patent: Nov. 9, 1999

[54] TRANSMISSION OF ORIGINATOR SUBSCRIBER NUMBER AFTER COMMUNICATION CHANNEL IS ESTABLISHED

[75] Inventor: Koiti Nagashima, Tokyo, Japan

[73] Assignee: NEC Corporation, Tokyo, Japan

[21] Appl. No.: 08/908,502

[22] Filed: Aug. 7, 1997

[30] Foreign Application Priority Data

Aug. 29, 1996 [JP] Japan ..................................... 8-228277

[51] Int. Cl.$^6$ ...................................................... H04M 3/00
[52] U.S. Cl. ........................... 379/229; 379/142; 379/399
[58] Field of Search ..................................... 379/142, 399

[56] References Cited

U.S. PATENT DOCUMENTS

| | | | |
|---|---|---|---|
| 5,457,741 | 10/1995 | Sonobe | 379/333 |
| 5,631,950 | 5/1997 | Brown | 379/142 |
| 5,781,623 | 7/1998 | Khakzar | 379/229 |
| 5,841,853 | 11/1998 | Yamanishi et al. | 379/215 |

*Primary Examiner*—Scott Wolinsky

[57] ABSTRACT

In a subscriber number transmission system in a multi-directional multiple communication system, a local switch generates a ringing signal and then generates an originator subscriber number. A base station generates a call reception message signal in response to the ringing signal from the local switch and stores the originator subscriber number transmitted from the local switch. A terminal station connected to a subscriber terminal receives the call reception message signal from the base station. In response to the call reception message signal, the terminal station outputs a ringing signal to the subscriber terminal and generates an originator subscriber number request message to the base station. The base station transmits the originator subscriber number in response to the originator subscriber number request message. The terminal station receives the originator subscriber number from the base station to output to the subscriber terminal.

17 Claims, 6 Drawing Sheets

TRANSMISSION OF ORIGINATOR SUBSCRIBER NUMBER AFTER COMMUNICATION CHANNEL IS ESTABLISHED

BACKGROUND OF THE INVENTION

1. Field of the Invention

The present invention relates to a subscriber number transmission apparatus and a method of transmitting a subscriber number in a multi-directional multiple communication system, and more particularly, a subscriber number transmission apparatus and a method of transmitting a subscriber number to a terminal station in a multi-directional multiple communication system, in which a subscriber number is transmitted after a terminal station is set to a ready state.

2. Description of the Related Art

Conventionally, a subscriber number transmission apparatus is designed in such a manner that a call reception information which contains a telephone number of a call originator can be noticed to a child station subscriber, even if there is not an empty call channel. Such a subscriber number transmission apparatus is disclosed in, for example, Japanese Laid Open Patent Disclosure (JP-A-Heisei 3-93394). In this apparatus, there is a case where a call to a child station is received in the state in which all communication channels are busy. In such a case, a sign al for noticing to the call originator that all the communication channels are busy and a signal for prompting for transmission of information such as a telephone number of the call originator are issued from a base station. Also, a signal indicating that a call is received when all the communication channels are busy and information such as the telephone number of the call originator are transmitted to the child station through a control channel. Thus, in the child station, an audio output or a screen display is performed based on the received information.

However, in the above-mentioned originator subscriber number transmission apparatus, a receiving section is used to receive the originator subscriber number after an off hook signal is sent out to a local switch. Accordingly, there is a problem in that a subscriber number transmission service as one of telephone services can not be accomplished in which the analog-modulated subscriber number is sent out when a terminal station is ready.

SUMMARY OF THE INVENTION

The present invention is accomplished in the light of the above-mentioned circumstances. Therefore, an object of the present invention is to provide a subscriber number transmission system and a method of transmitting a subscriber number in a multi-directional multiple communication system which contains a terminal station implementing a battery saving function, in which an originator subscriber number which is sent out from a local switch on call reception is transmitted to a subscriber terminal which is accommodated in the terminal station.

Another object of the present invention is to provide a subscriber number transmission system and a method of transmitting an originator subscriber number in a multi-directional multiple communication system, in which a subscriber number transmission service as one of telephone services is made possible, resulting in improvement of user services.

In order to achieve an aspect of the present invention, a subscriber number transmission system in a multi-directional multiple communication system, includes a local switch for generating a ringing signal and then generating an originator subscriber number, a base station for generating a call reception message signal in response to the ringing signal from the local switch, for storing the originator subscriber number transmitted from the local switch, and for transmitting the originator subscriber number in response to an originator subscriber number request message, and a terminal station to which a subscriber terminal is connected, for receiving the call reception message signal from the base station, for outputting a ringing signal to the subscriber terminal in response to the call reception message signal, for generating the originator subscriber number request message to the base station in response to the call reception message signal, and for receiving the originator subscriber number from the base station to output to the subscriber terminal.

The base station may include a subscriber line interface unit for detecting the local switch ringing signal to generate a ringing reception message, for storing the originator subscriber number transmitted from the local switch, and for outputting the originator subscriber number in response to the subscriber number request message, and a control unit for generating the call reception message signal to the terminal station in response to the ringing reception message, for receiving the subscriber number request message from the terminal station to output to the subscriber line interface unit, and for receiving the originator subscriber number from the subscriber line interface unit to output to the terminal station. In this case, the subscriber line interface unit includes a ringing detecting section for detecting the local switch ringing signal to generate the ringing reception message, an analog-digital (A/D) converting section for A/D converting the originator subscriber number, which is transmitted in an analog form from the local switch, into a digital form, and a storage section for storing the originator subscriber number in the digital form, and for outputting the originator subscriber number to the control unit in response to the subscriber number request message from the control unit.

Alternatively, the base station may includes a subscriber line interface unit for detecting the local switch ringing signal to generate a ringing reception message, and for analog-to-digital (A/D) converting the originator subscriber number, which is transmitted in an analog form from the local switch, into a digital form, a control unit for generating the call reception message signal in response to the ringing reception message, and for reading the originator subscriber number from the storage unit in response to the originator subscriber number request message, and a storage section for receiving the originator subscriber number in the digital form from the subscriber line interface unit to store therein, and for outputting the originator subscriber number to the control unit in response to the subscriber number request message from the control unit. In this case, the subscriber line interface unit includes a ringing detecting section for detecting the local switch ringing signal to generate the ringing reception message, and an A/D converting section for A/D converting the originator subscriber number into a digital form.

In either case, the terminal station includes a base station interface unit for receiving the call reception message signal from the base station, for transmitting the originator subscriber number request message to the base station, and for receiving the originator subscriber number, a ringing circuit for generating the terminal station ringing signal, a subscriber circuit connected to the subscriber terminal, and a control unit for outputting the terminal station ringing signal from the ringing circuit to the subscriber terminal via the subscriber circuit in response to the call reception message signal received from the base station, for generating the originator subscriber number request message to output to the base station, and for outputting the originator subscriber number from the base station to the subscriber terminal via the subscriber circuit in response to reception of the originator subscriber number from the base station.

When the terminal station further comprises a battery saving section which is normally activated, the terminal station control unit desirably inactivates the battery saving section in response to the call reception message signal and then generates the originator subscriber number request message to output to the base station.

In order to achieve another aspect of the present invention, a method of transmitting an originator subscriber number in a multi-directional multiple communication system, includes the steps of:

generating a first ringing signal from a local switch;

generating an originator subscriber number from the local switch;

transmitting a second ringing signal to a subscriber terminal in response to a call reception message triggered by the first ringing signal;

generating an originator subscriber number request message after transmitting the second ringing signal; and transmitting the originator subscriber number and a third ringing signal to the subscriber terminal in response to the originator subscriber number request.

In order to achieve still another aspect of the present invention, a subscriber number transmission system in a multi-directional multiple communication system, includes a local switch for generating a ringing signal and then generating an originator subscriber number, a base station for generating a call reception message signal in response to the ringing signal from the local switch, for storing the originator subscriber number transmitted from the local switch, and for transmitting the originator subscriber number in response to an originator subscriber number request message, and a terminal station, to which a subscriber terminal is connected, for establishing a communication channel between the base station and the terminal station in response to the call reception message signal, for outputting a ringing signal to the subscriber terminal in response to the call reception message signal, for generating the originator subscriber number request message to the base station using the communication channel, and for receiving the originator subscriber number to output to the subscriber terminal.

DESCRIPTION OF THE PREFERRED EMBODIMENTS

A subscriber number transmission apparatus in a multi-directional multiple communication system of the present invention will be described below in detail with reference to the accompanying drawings.

Figure 1:
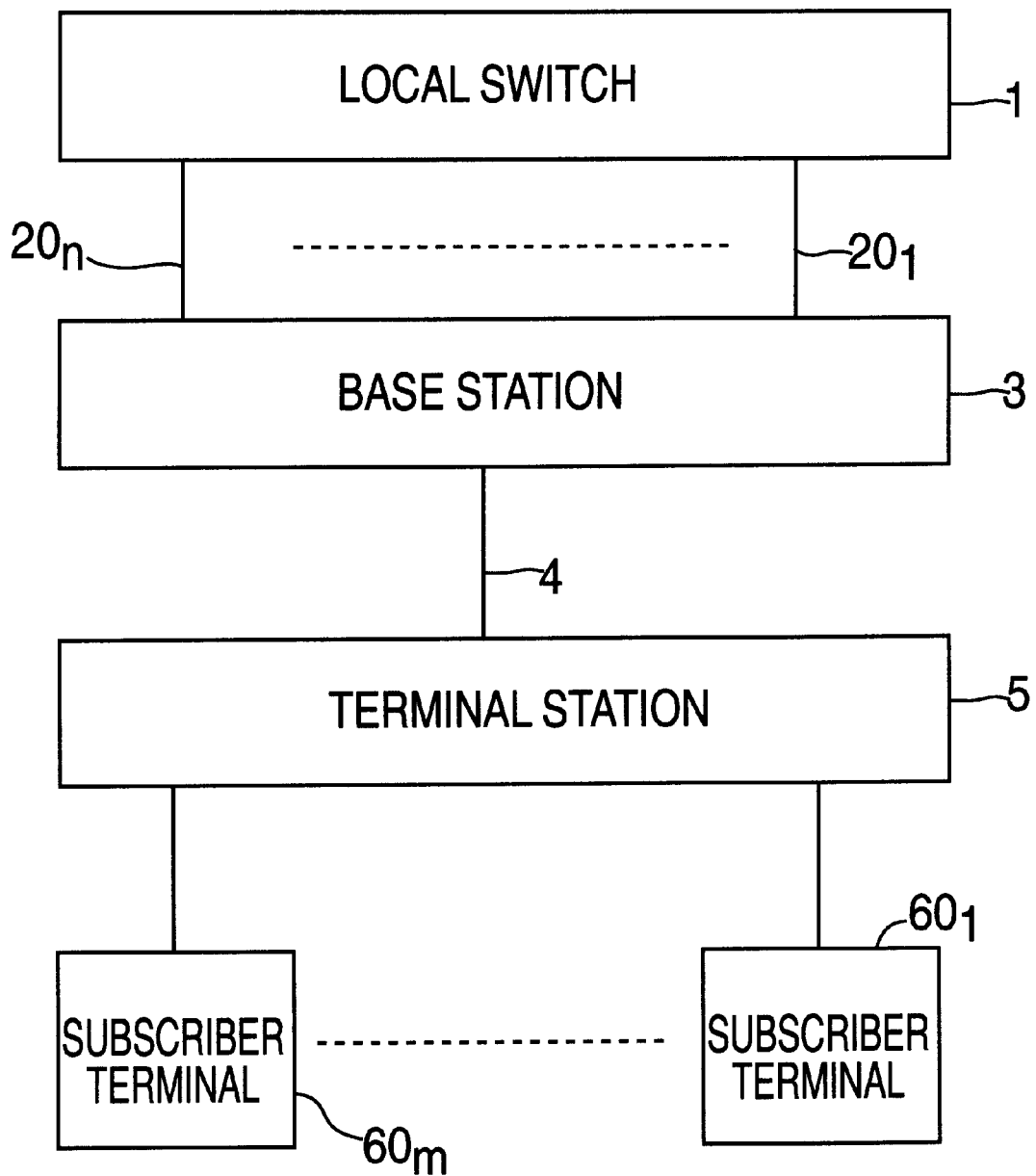
FIG. 1 is a block diagram illustrating the structure of a multi-directional multiple communication system according to the first embodiment of the present invention.

FIG. 1 is a block diagram illustrating the structure of the originator subscriber number transmission apparatus in the multi-directional multiple communication system according to the first embodiment of the present invention. Referring to FIG. 1, the originator subscriber number transmission apparatus in the multi-directional multiple communication system is composed of a local switch 1, a base station 3, a terminal station 5, and a subscriber terminals $60_1$ to $60_m$ (m is an integer equal to or more than 2). The base station 3 communicates with the local switch 1 through analog channel subscriber line $20_1$ to $20_n$ (n is an integer equal to or more than 2). The base station 3 communicates with the terminal station 5 through a multi-directional multiple communication channel 4 which is time division multiplexed. Also, the terminal station 5 communicates with the subscriber terminal $60_1$ to $60_m$.

Figure 2:
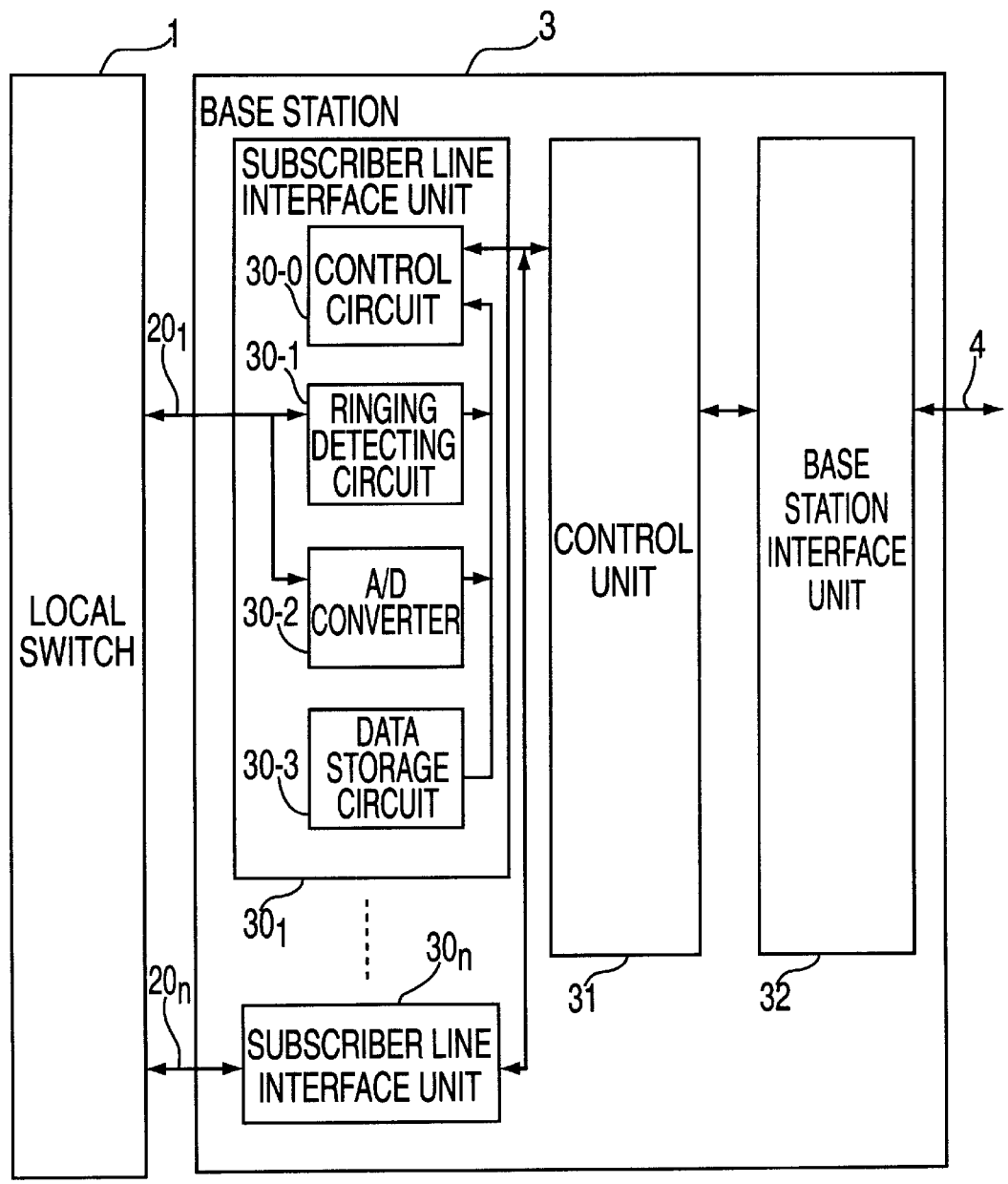
FIG. 2 is a block diagram illustrating the structure of a base station shown in FIG. 1.

FIG. 2 is a block diagram illustrating the structure of the base station 3 shown in FIG. 1. Referring to FIG. 2, the base station 3 is composed of subscriber line interface units $30_1$ to $30_n$, a control unit 31 and a base station interface unit 32. Each of the subscriber line interface units $30_1$ to $30_n$ communicates with the local switch 1 using a corresponding one of analog channels $20_1$ to $20_n$. The subscriber line interface units $30_1$ to $30_n$ have the same circuit structure. For example, the subscriber line interface unit $30_1$ is composed of a control circuit 30-0, a ringing detecting circuit 30-1, an analog/digital (A/D) converting circuit 30-2, and a data storage circuit 30-3.

The ringing detecting circuit 30-1 detects a ringing signal transmitted from the local switch 1 through the analog channel $20_1$. The A/D converting circuit 30-2 decodes an analog originator subscriber number transmitted from the local switch 1 through the analog channel $20_1$ and digitizes the decoded originator subscriber number into a digital form. The data storage circuit 30-4 stores a digitized originator subscriber number. The control circuit 30-0 transmits and receives data to and from the control unit 31.

The control unit 31 is a main control unit of the base station 3. The control unit 31 receives a ringing reception message and transmits a call reception message and an originator subscriber number from each of the subscriber line interface units $30_1$ to $30_n$ to the base station interface unit 32. The base station interface unit 32 transmits them to the terminal station 5 via a time division multiplexed communication channel 4.

Figure 3:
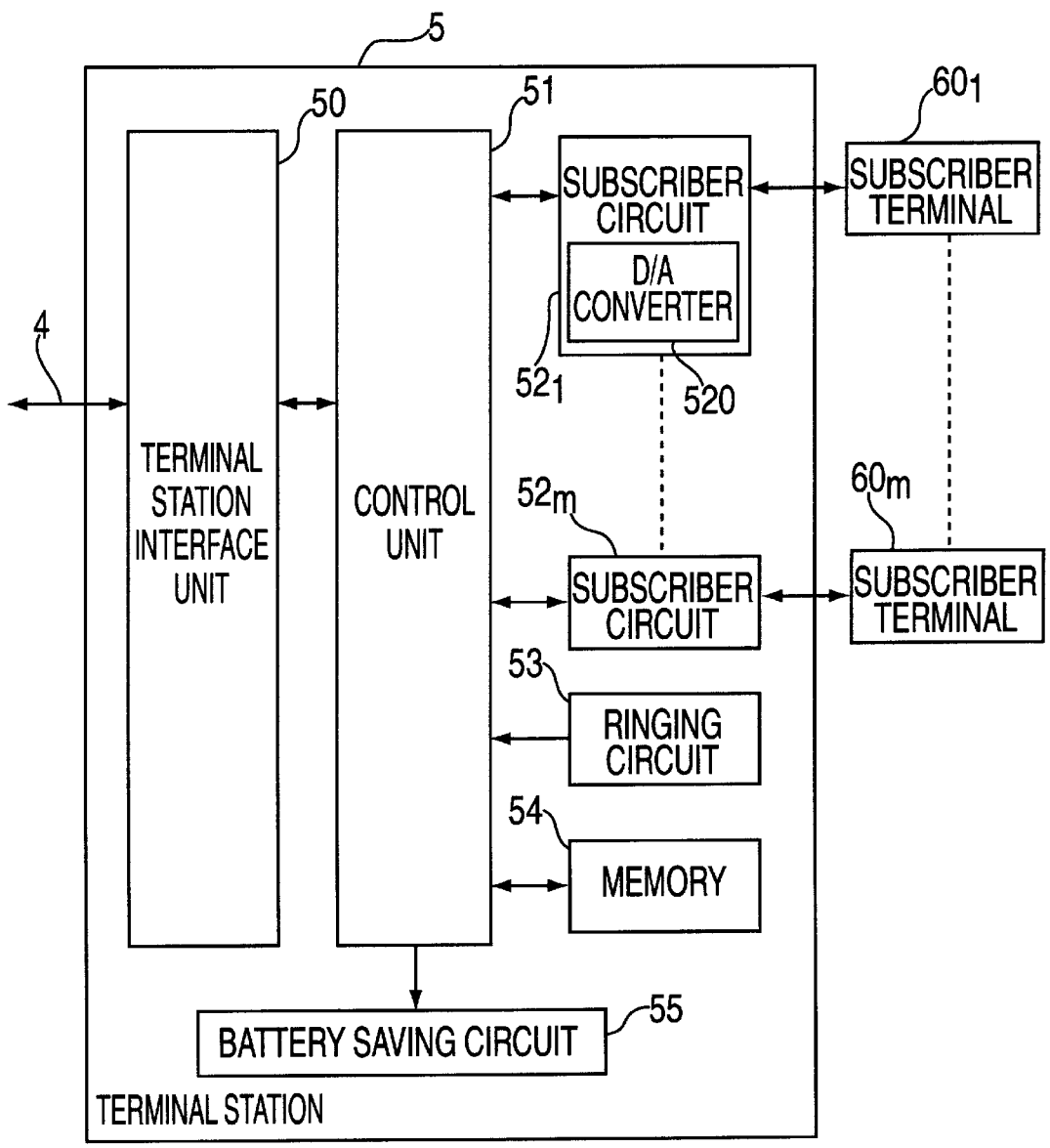
FIG. 3 is a block diagram illustrating the structure of a terminal station shown in FIG. 1.

FIG. 3 is a block diagram illustrating the structure of the terminal station 5 shown in FIG. 1. Referring to FIG. 3, the terminal station 5 is composed of a terminal station interface unit 50, a control unit 51, subscriber circuits $52_1$ to $52_m$, a ringing circuit 53, a memory 54, and a battery saving circuit 55. The subscriber terminals $60_1$ to $60_m$ are connected to the subscriber circuits $52_1$ to $52_n$, respectively. Each of the subscriber circuits $52_1$ to $52_n$ includes a digital-to-analog (D/A) converting circuit 520. The terminal station interface unit 50 communicates with the base station 3. The control unit 51 is a main control unit of the terminal station 5. The control unit 51 analyzes a call reception message transmitted from the base station 3. The control circuit 51 inactivates the battery saving circuit 55, which normally operates, in response to the call reception message and then establishes a communication channel between the terminal station and the base station and a communication channel between the subscriber terminal and the terminal station. Also, the control unit 51 transmits a reply message and a subscriber number request message to the base station 3 using the established communication channel 4. Further, the control unit 51 controls the ringing circuit 53 to generate a ringing signal and reads the second ringing pattern and subsequent ringing patterns from the memory 54. Each of the subscriber circuits $52_1$ to $52_m$ controls the sending-out of the ringing signal to the corresponding one of the subscriber terminals $60_1$ to $60_m$. Also, each of the subscriber circuits $52_1$ to $52_m$ converts the originator subscriber number sent out from the base station 3 into an analog form by the D/A converting circuit 520 and sends out to the corresponding one of the telephone subscriber terminal $60_1$ to $60_m$.

Figure 4:
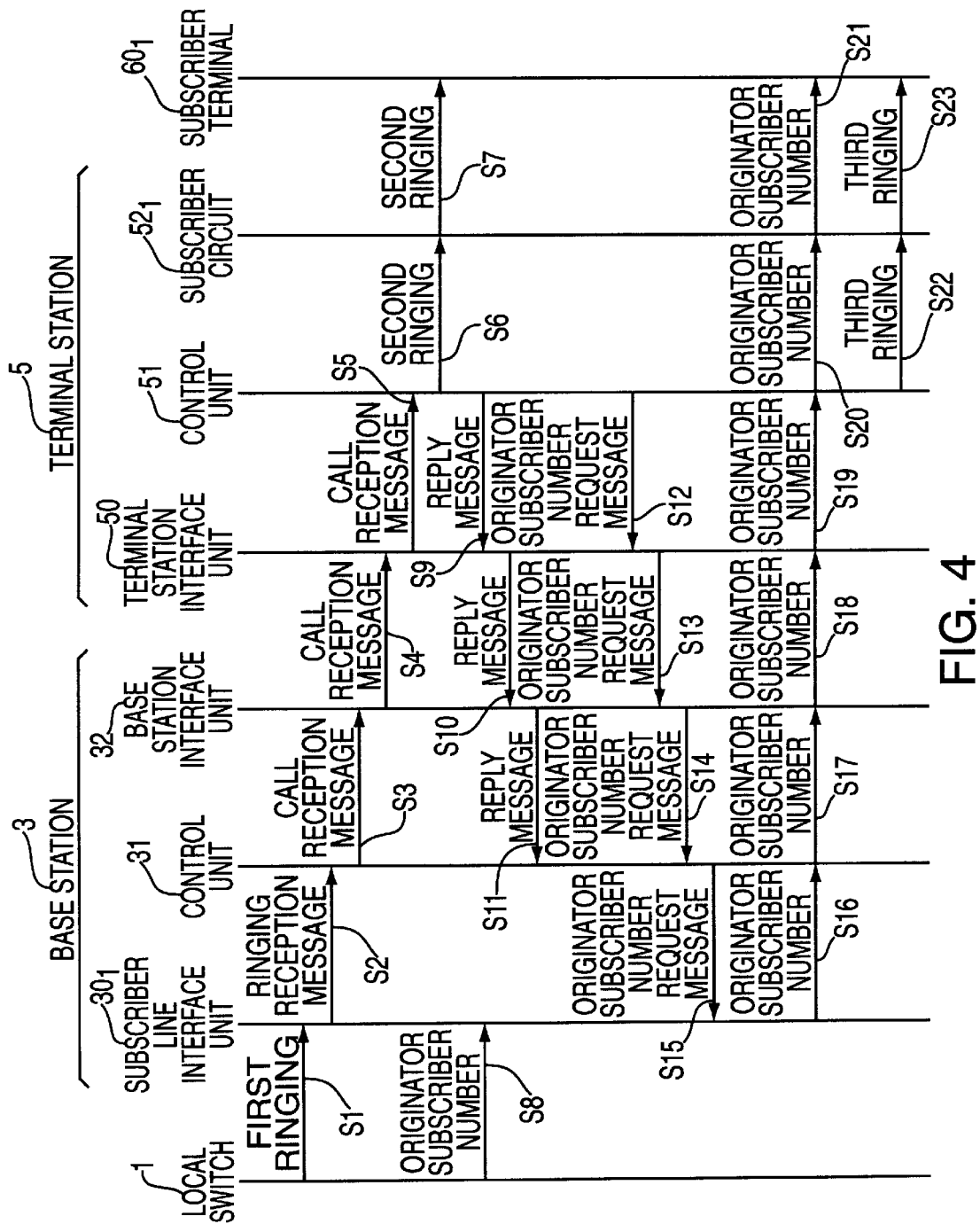
FIG. 4 is a sequence diagram to explain the operation of the multi-directional multiple communication system according to the first embodiment of the present invention.

Next, the operation of the subscriber number transmission apparatus in the multi-directional multiple communication system according to the first embodiment of the present invention will be described below with reference to FIG. 4.

In a step S1, a first ringing signal is sent from the local switch 1 to the base station 3 through the subscriber line $20_1$. The ringing detecting circuit 30-1 of the subscriber line interface unit $30_1$ of the base station 3 detects the first ringing signal and informs reception of a call to the control circuit 30-0 of the subscriber line interface unit $30_1$. The control circuit 30-0 sends out a ringing reception message to the control unit 31 in a step S2 in response to the information using a control channel. When receiving the ringing reception message from the control circuit 30-0, the control unit 31 sends out a call reception message to the base station interface unit 32 through the control channel in a step S3. Between the control unit 31 and the base station interface unit 32, the message is transmitted using the control channel, and a speech digital data is transmitted using a communication channel. The base station interface unit 32 sends out the call reception message to the terminal station interface unit 50 of the terminal station 5 through a communication channel in a step S4. A communication channel number is notified from the control unit 31 to the base station interface unit 32. In this case, the communication channel number can be allocated every time the control unit 31 receives a ringing reception message from the control circuit 30-0.

When receiving the call reception message, the terminal station interface unit 50 of the terminal station 5 sends out the call reception message to the control unit 51 in a step S5. The control unit 51 controls the battery saving circuit 55 to stop a battery saving operation by which a reception circuit is turned on or off with a constant period. Also, the control unit 51 controls the ringing circuit 53 when the call reception message is received from the terminal station interface unit 50. The control unit 51 sends out a second ringing signal to the telephone subscriber terminal $60_1$ via the subscriber circuit $52_1$ in steps S6 and S7. Also, the control unit 51 sends out a reply message to the control unit 31 of the base station 3 in steps S9 to S11 using the communication channel which is the same as the call reception message is transmitted from the base station 3 to the terminal station interface unit 50.

When receiving the reply message via the base station interface unit 32 in the step S11, the control unit 31 of the base station 3 determines that the call reception message successfully reaches the terminal station 5, based on the reception of this reply message. Hereinafter, the transmission and reception of a message and the digital data between the base station 3 and the terminal station 5 are performed using the above-mentioned communication channels.

In this embodiment, the analog originator subscriber number is sent from the local switch 1 to the subscriber line interface unit $30_1$ through the subscriber line 20 in a step S8 after the first ringing signal. At this time, the originator subscriber number is converted into a digital data by the A/D converting circuit 30-2 of the subscriber line interface unit $30_1$ of the base station 3 and is stored in the data storage circuit 30-3.

The control unit 51 of the terminal station 5 sends out an originator subscriber number request message to the base station 3 through the terminal station interface unit 50 in steps S12 to S14 after sending out the second ringing signal to the telephone subscriber terminal $60_1$. In this case, the originator subscriber number request message is sent out to the control unit 31 through the base station interface unit 32 of the base station 3 in the step S14.

When receiving the originator subscriber number request message, the control unit 31 sends out the originator subscriber number request message to the control circuit 30-0 of the subscriber line interface unit $30_1$ in a step S15. When receiving the originator subscriber number request message, the control circuit 30-0 reads the originator subscriber number stored in the data storage circuit 30-3 in the digital form. The control circuit 30-0 sends out the originator subscriber number to the terminal station 5 via the control unit 31 and the base station interface unit 32 in steps S16 to S18.

The control unit 51 of the terminal station 5 receives the originator subscriber number through the terminal station interface unit 50 in a step S19 and sends out it to the subscriber circuit $52_1$ in a step S20. Subsequently, the originator subscriber number which is sent out to the subscriber circuit $52_1$ is converted into the analog form by the D/A converting circuit 520 and is sent out to the telephone subscriber terminal $60_1$ in a step S21. Control unit 51 also sends out a third ringing signal through subscriber circuit $52_1$ to the telephone subscriber terminal $60_1$ in steps S22 and S23.

Figure 5:
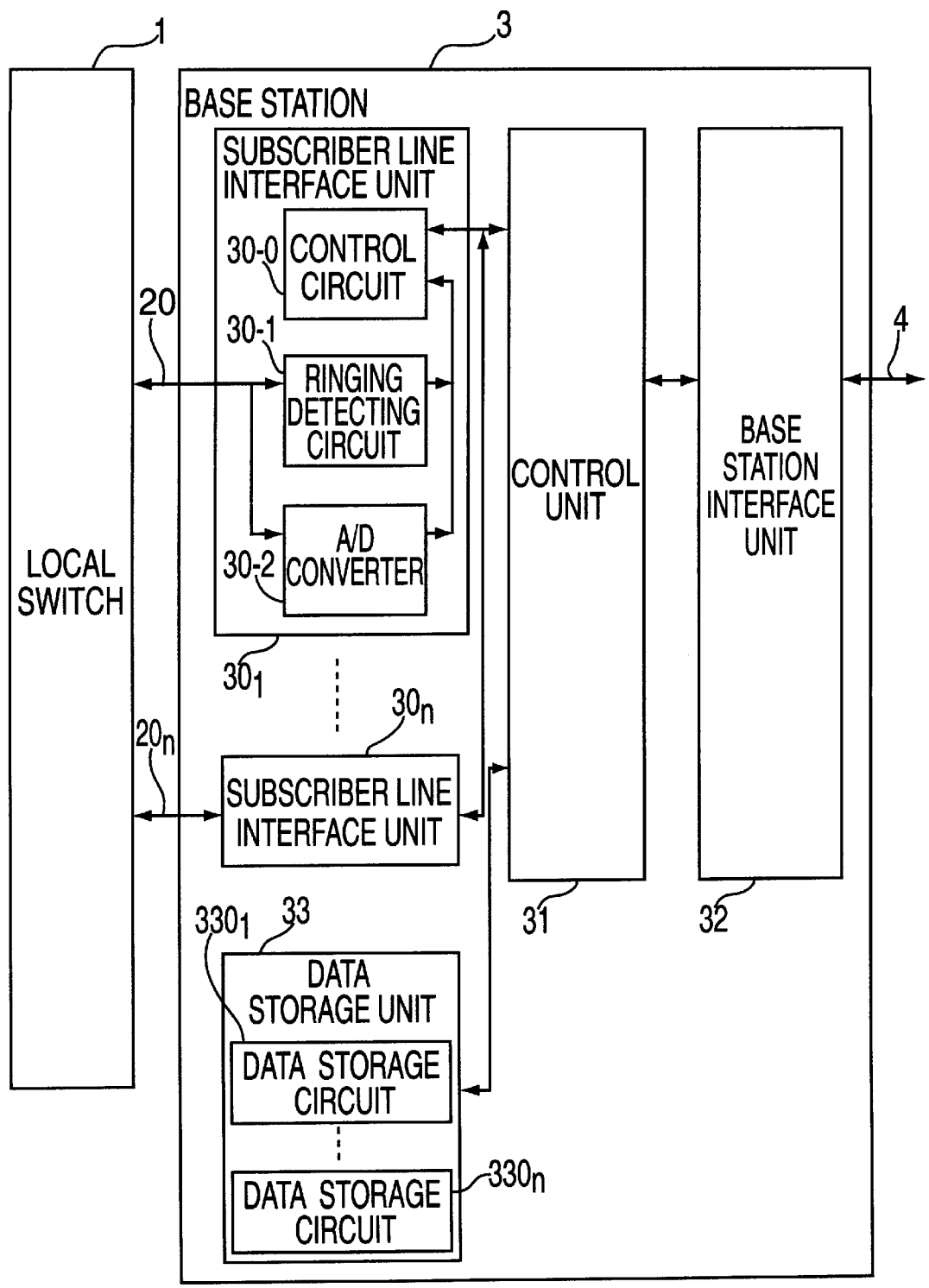
FIG. 5 is a block diagram illustrating the structure of a base station of a subscriber number transmission system in a multi-directional multiple communication system according to the second embodiment of the present invention.

Next, the subscriber number transmission apparatus in the multi-directional multiple system according to the second embodiment of the present invention will be described below in detail with reference to FIG. 5.

The point in which the second embodiment is different from the first embodiment is that a data storage unit 33 is provided instead of the data storage circuit 30-3 of each of the subscriber line interface circuit $30_1$ to $30_n$ of the base station 3. The data storage unit 33 is connected to the control unit 31. Also, the data storage unit 33 is composed of data storage circuits $330_1$ to $330_n$.

Figure 6:
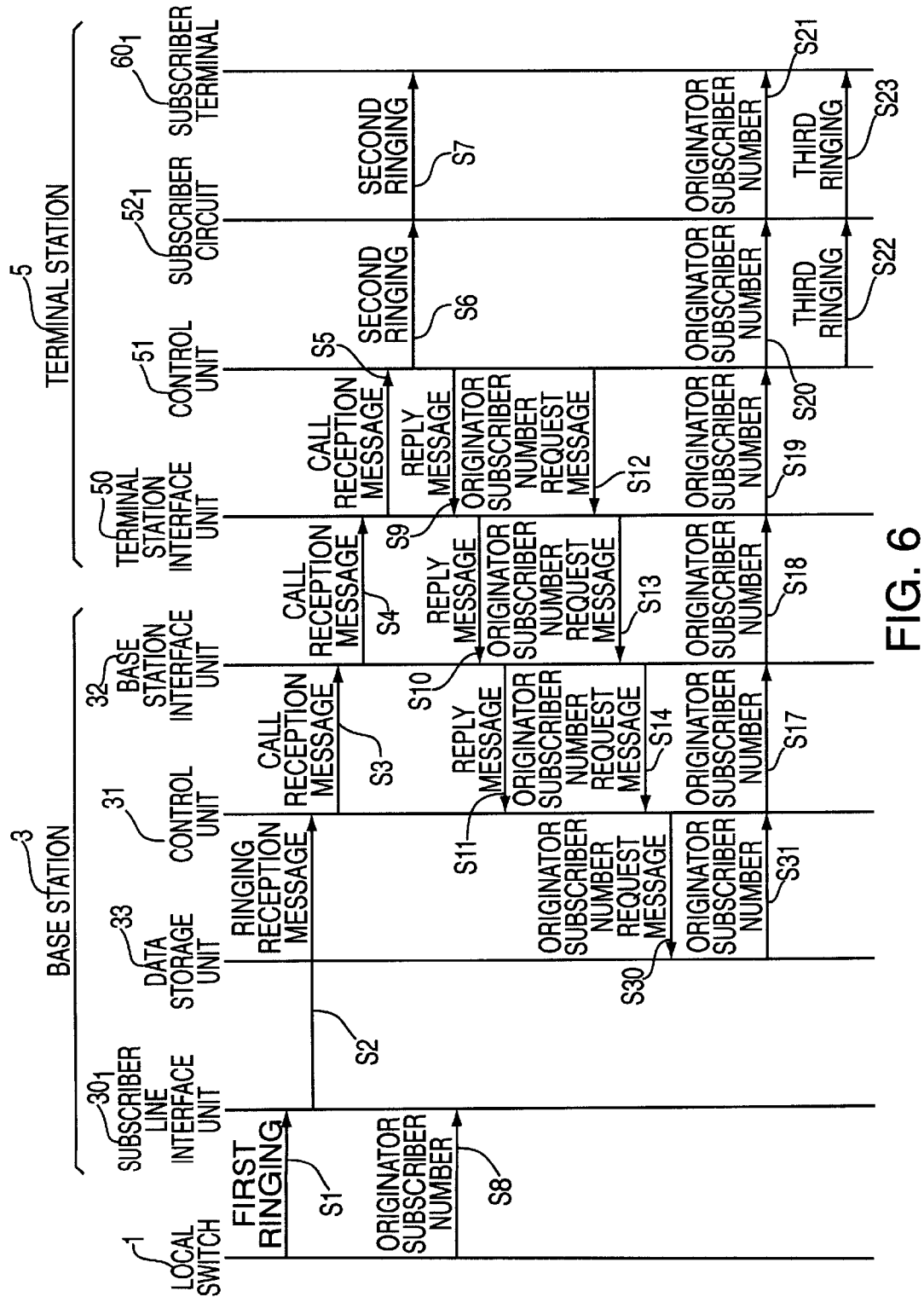
FIG. 6 is a sequence diagram to explain the operation of the multi-directional multiple communication system according to the second embodiment of the present invention.

Next, the operation of the subscriber number transmission apparatus in the second embodiment will be described below with reference to FIG. 6. In FIG. 6, the same operations as in the first embodiment shown in FIG. 4 are allocated with the same step numbers, respectively.

When the first ringing signal is sent out from the local switch 1 to the base station 3 through the subscriber line $20_1$ in the step S1, the ringing detecting circuit 30-1 of the subscriber line interface unit $30_1$ detects the first ringing signal and informs it to the control circuit 30-0. The control circuit 30-0 sends out the ringing reception message to the control unit 31 in response to this notice in the step S2. When receiving the ringing reception message from the control circuit 30-0, the control unit 31 sends out the call reception message to the terminal station 5 through the communication channel via the base station interface unit 32 in the steps S3 to S5. Also, the control unit 31 sends out an originator subscriber number reception instruction to the data storage unit 330 of the data storage apparatus 33.

In the subscriber number transmission apparatus in the multi-directional multiple transmission system in the second embodiment, the analog originator subscriber number is sent out after the first ringing signal. The analog originator subscriber number from the local switch 1 is converted into the digital form by the A/D converting circuit 30-2 of the subscriber line interface circuit $30_1$. The digital originator subscriber number is stored in the data storage unit $330_1$ of the data storage apparatus 33 through the control circuit 30-0 and the control unit 31 at the step S8.

The control unit 31 of the base station 3 reads the originator subscriber number stored in the data storage unit $330_1$ when receiving the originator subscriber number request message from the terminal station 5 in the steps S12 to S14. The control unit 31 sends out the originator subscriber number request message to the data storage apparatus 33 in a step S30, and transmits the originator subscriber number, which is outputted from the data storage unit $330_1$ in a step S31, to the terminal station 5 through the communication channel via the base station interface unit 32 in the steps S17 to S19.

In the second embodiment, the data storage unit 33 is not arranged in the subscriber line interface units $30_1$ to $30_n$, unlike the first embodiment. However, because the data storage unit 33 is arranged in common to the subscriber line interface units $30_1$ to $30_n$, the price of each of the subscriber line interface units $30_1$ to $30_n$ can be decreased.

As described above, in the subscriber number transmission apparatus in the multi-directional multiple communication system of the present invention, the originator subscriber number is sent out in an analog form from the local switch 1 after the first ringing signal. The analog originator subscriber number is converted into a digital form by the A/D converting circuit 30-2 of a corresponding one of the subscriber line interface units $30_1$ to $30_n$ of the base station 2, and is previously stored in a corresponding one of the data storage unit $330_1$ to $330_n$. For this reason, after the communication channel is established between the base station 3 and the terminal station 5 in the above embodiments, the originator subscriber number can be sent out from the base station 3 to the terminal station 5 in response to the originator subscriber number request message from the terminal station 5. Therefore, during the period when the terminal station 5 is performing a battery saving operation, the originator subscriber number from the local switch 1 can be transmitted to the telephone subscriber terminal 60 accommodated in the terminal station 5 which takes a long time for the establishment of the communication channel with the base station 3. In accordance with, according to the present invention, even if the terminal station is performing the battery saving operation, the originator subscriber number can be transmitted from the local switch 1 to the telephone subscriber terminal 60 accommodated in the terminal station 5. In this manner, the originator subscriber number transmission service as one of the telephone services becomes possible, resulting in the performance improvement of the system.

Further, as described above, in the present invention, the analog originator subscriber number is sent out from the local switch after the first ringing signal, is converted into the digital form by the subscriber line interface unit of the base station, and is stored in the data storage circuit. Therefore, after the communication channel is established between the base station and the terminal station, the originator subscriber number can be transmitted from the base station to the terminal station in response to the originator subscriber number request message from the terminal station, using the established communication channel. In this manner, because the terminal station can control the transmission of the ringing signal to the telephone subscriber terminal, the originator subscriber number can be transmitted from the local switch to the telephone subscriber terminal, even if the terminal station is performing the battery saving operation.

Also, according to the present invention, even though all the communication channels are busy between the base station and the terminal station when the first ringing is received from the local switch, the originator subscriber number can be transmitted if one of the communication channels becomes available before generation of the ringing signal from the local switch is stopped.

What is claimed is:

1. A subscriber number transmission system in a multi-directional multiple communication system, comprising:

a local switch for generating a ringing signal and then generating an originator subscriber number;

a base station for generating a call reception message signal in response to said ringing signal from said local switch, for storing said originator subscriber number transmitted from said local switch, and for transmitting said originator subscriber number in response to an originator subscriber number request message; and a terminal station to which a subscriber terminal is connected, for receiving said call reception message signal from said base station, for outputting a ringing signal to said subscriber terminal in response to said call reception message signal, for generating said originator subscriber number request message to said base station in response to said call reception message signal, and for receiving said originator subscriber number from said base station to output to said subscriber terminal.

2. A subscriber number transmission system according to claim 1, wherein said base station comprises:

a subscriber line interface unit for detecting said local switch ringing signal to generate a ringing reception message, for storing said originator subscriber number transmitted from said local switch, and for outputting said originator subscriber number in response to said subscriber number request message; and a control unit for generating said call reception message signal to said terminal station in response to said ringing reception message, for receiving said subscriber number request message from said terminal station to output to said subscriber line interface unit, and for receiving said originator subscriber number from said subscriber line interface unit to output to said terminal station.

3. A subscriber number transmission system according to claim 2, wherein said subscriber line interface unit comprises:

a ringing detecting section for detecting said local switch ringing signal to generate said ringing reception message;

an analog-digital (A/D) converting section for A/D converting said originator subscriber number, which is transmitted in an analog form from said local switch, into a digital form; and a storage section for storing said originator subscriber number in the digital form, and for outputting said originator subscriber number to said control unit in response to said subscriber number request message from said control unit.

4. A subscriber number transmission system according to claim 1, wherein said base station comprises:

a subscriber line interface unit for detecting said local switch ringing signal to generate a ringing reception message, and for analog-to-digital (A/D) converting said originator subscriber number, which is transmitted in an analog form from said local switch, into a digital form;

a control unit for generating said call reception message signal in response to said ringing reception message, and for reading said originator subscriber number from said storage unit in response to said originator subscriber number request message; and a storage section for receiving said originator subscriber number in the digital form from said subscriber line interface unit to store therein, and for outputting said originator subscriber number to said control unit in response to said subscriber number request message from said control unit.

5. A subscriber number transmission system according to claim 4, wherein said subscriber line interface unit comprises:

a ringing detecting section for detecting said local switch ringing signal to generate said ringing reception message; and an A/D converting section for A/D converting said originator subscriber number into a digital form.

6. A subscriber number transmission system according to claim 1, wherein said terminal station comprises:

a base station interface unit for receiving said call reception message signal from said base station, for transmitting said originator subscriber number request message to said base station, and for receiving said originator subscriber number;

a ringing circuit for generating said terminal station ringing signal;

a subscriber circuit connected to said subscriber terminal; and a control unit for outputting said terminal station ringing signal from said ringing circuit to said subscriber terminal via said subscriber circuit in response to said call reception message signal received from said base station, for generating said originator subscriber number request message to output to said base station, and for outputting said originator subscriber number from said base station to said subscriber terminal via said subscriber circuit in response to reception of said originator subscriber number from said base station.

7. A subscriber number transmission system according to claim 6, wherein said terminal station further comprises a battery saving section which is normally activated, and wherein said terminal station control unit inactivates said battery saving section in response to said call reception message signal and then generates said originator subscriber number request message to output to said base station.

8. A method of transmitting an originator subscriber number in a multi-directional multiple communication system, comprising the steps of:

generating a first ringing signal from a local switch;

generating an originator subscriber number from said local switch;

transmitting a second ringing signal to a subscriber terminal in response to a call reception message triggered by said first ringing signal;

generating an originator subscriber number request message after transmitting said second first ringing signal; and transmitting said originator subscriber number and a third ringing signal to said subscriber terminal in response to said originator subscriber number request.

9. A method according to claim 8, wherein said step of transmitting a second ringing signal includes:

generating a call reception message signal in a base station in response to said first ringing signal; and generating said second ringing signal in a terminal station in response to said call reception message signal to transmit said second ringing signal to said subscriber terminal.

10. A method according to claim 9, further comprising the step of stopping a battery saving function in said terminal station in response to said call reception message signal.

11. A method according to claim 8, wherein said step of transmitting said originator subscriber number and a third ringing signal includes:

analog-to-digital converting said originator subscriber number into a digital form;

storing said originator subscriber number in the digital form;

reading out said originator subscriber number in response to said originator subscriber number request message issued from a terminal station; and digital-to-analog converting said originator subscriber number into the analog form in said terminal station to transmit to said subscriber terminal.

12. A method according to claim 8, wherein said step of generating an originator subscriber number request message includes generating said originator subscriber number request message in a terminal station in response to said call reception message signal.

13. A subscriber number transmission system in a multi-directional multiple communication system, comprising:

a local switch for generating a ringing signal and then generating an originator subscriber number;

a base station for generating a call reception message signal in response to said ringing signal from said local switch, for storing said originator subscriber number transmitted from said local switch, and for transmitting said originator subscriber number in response to an originator subscriber number request message; and a terminal station, to which a subscriber terminal is connected, for establishing a communication channel between said base station and said terminal station in response to said call reception message signal, for outputting a ringing signal to said subscriber terminal in response to said call reception message signal, for generating said originator subscriber number request message to said base station using said communication channel, and for receiving said originator subscriber number to output to said subscriber terminal.

14. A subscriber number transmission system according to claim 13, wherein said terminal station establishes said communication channel after stopping a battery saving operation in response to said call reception message signal.

15. A subscriber number transmission system according to claim 14, wherein said base station comprises:
  a subscriber line interface unit for detecting said local switch ringing signal to generate a ringing reception message, for storing said originator subscriber number transmitted from said local switch, and for outputting said originator subscriber number in response to said subscriber number request message; and
  a control unit for generating said call reception message signal to said terminal station in response to said ringing reception message, for receiving said subscriber number request message from said terminal station to output to said subscriber line interface unit, and for receiving said originator subscriber number from said subscriber line interface unit to output to said terminal station.

16. A subscriber number transmission system according to claim 15, wherein said subscriber line interface unit comprises:
  a ringing detecting section for detecting said local switch ringing signal to generate said ringing reception message;
  an analog-digital (A/D) converting section for A/D converting said originator subscriber number, which is transmitted in an analog form from said local switch, into a digital form; and
  a storage section for storing said originator subscriber number in the digital form, and for outputting said originator subscriber number to said control unit in response to said subscriber number request message from said control unit.

17. A subscriber number transmission system according to claim 14, wherein said base station comprises:
  a subscriber line interface unit for detecting said local switch ringing signal to generate a ringing reception message, and for analog-to-digital (A/D) converting said originator subscriber number, which is transmitted in an analog form from said local switch, into a digital form;
  a control unit for generating said call reception message signal in response to said ringing reception message, and for reading said originator subscriber number from said storage unit in response to said originator subscriber number request message; and
  a storage section for receiving said originator subscriber number in the digital form from said subscriber line interface unit to store therein, and for outputting said originator subscriber number to said control unit in response to said subscriber number request message from said control unit.

* * * * *